Aug. 8, 1950     C. K. BECK ET AL     2,518,217
APPARATUS FOR TESTING TENSILE CHARACTERISTICS
OF A MATERIAL
Filed July 3, 1945
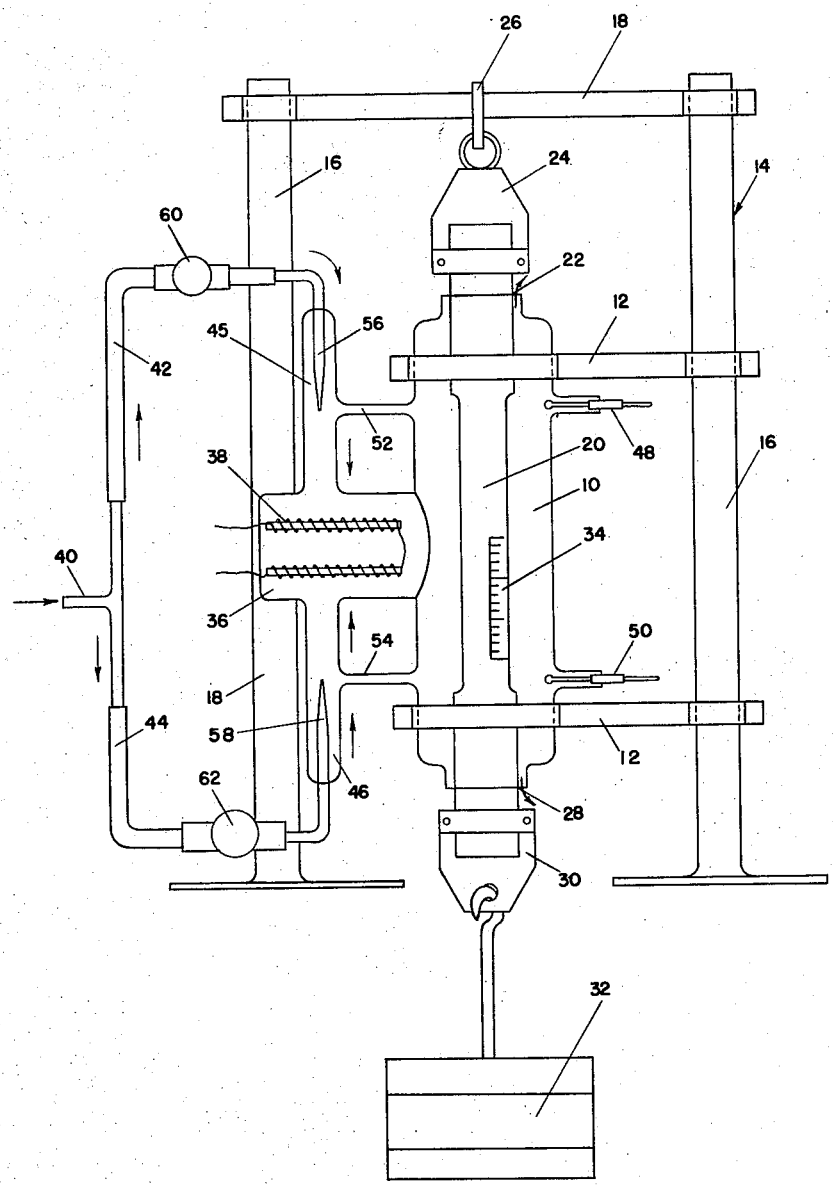
INVENTOR
CLIFFORD K. BECK
DAVID KIRKPATRICK
BY
ATTORNEY Patented Aug. 8, 1950

2,518,217

UNITED STATES PATENT OFFICE 2,518,217

APPARATUS FOR TESTING TENSILE CHARACTERISTICS OF A MATERIAL

Clifford K. Beck and David Kirkpatrick, Oak Ridge, Tenn., assignors to the United States of America as represented by the United States Atomic Energy Commission Application July 3, 1945, Serial No. 603,089

4 Claims. (Cl. 73—15.6)

This invention relates to mechanical testing apparatus and more particularly to improved apparatus for determining the tensile properties of a material at a controlled temperature.

In determining the characteristics of metals that are to be used for structural and other purposes it is frequently desirable to measure the tensile characteristics of the metal, such as tensile strength, elastic limit, elastic modulus and the like. These characteristics vary with temperature and in cases where the metal is to be stressed at an elevated or depressed temperature it is sometimes desirable that the test piece be maintained at a predetermined and corresponding temperature while its tensile characteristics are being measured.

It is accordingly an object of the present invention to provide improved apparatus for testing the tensile characteristics of a material at a temperature other than atmospheric temperature.

It is a further object of the invention to provide such tensile testing apparatus wherein the test piece is uniformly maintained at a predetermined desired temperature while it is being stressed.

It is still another object of the invention to provide tensile testing apparatus of this character wherein the temperature of the test piece is easily, rapidly and accurately controllable.

Other objects of the invention will be in part obvious and in part pointed out hereinafter.

The many objects and advantages of the present invention may be best understood by reference to the accompanying drawing which shows a tensile tester incorporating a preferred embodiment of the present invention. Referring to the drawing the numeral 10 designates a glass casing which is supported by the clamps 12 that are in turn fixed to a frame 14 comprising the vertical standards 16 and cross-bar 18. Supported from the cross-bar 18 and suspended within the transparent casing 10 there is a strip 20 of the material to be tested. At its upper end the strip 20 passes through a close-fitting hole 22 in the top of casing 10 and is held in a clamp 24 supported by a ring 26 which is in turn supported on the horizontal bar 18 of the frame 14. At its lower end the test strip 20 passes through a close-fitting hole 28 in the bottom of the casing 10 and is held in a clamp 30 on which is suspended a plurality of weights 32. On the face of the test strip 20 within the casing 10 there is a reference scale 34 which is adapted to cooperate with a fixed reference mark outside the casing 10, for example, a reference mark in a micrometer microscope (not shown), to indicate the elongation of the strip when a predetermined weight 32 is suspended therefrom. Thus by suspending predetermined different weights from the clamps 30 and observing the movement of the reference scale 34 the elongation of the strip 20 for a given applied stress may be determined.

As pointed out above it is sometimes desirable to determine the tensile characteristics of a test piece at a predetermined constant or variable temperature other than atmospheric temperature and in the present construction means are provided for attaining this objective. Extending from the side of the casing 10 at a point approximately midway between the ends of the casing there is a heating chamber 36 containing a heating element 38 which may be supplied with electrical energy from any suitable source (not shown). A heating gas such as air is supplied through a supply pipe 40 and flows through branch pipes 42 and 44 into the upwardly and downwardly extending arms 45 and 46 of the heating chamber 36. The air then flows through the heating chamber 36, where it is heated, to the interior of the casing 10 where it flows over the test strip 20 to heat the strip to the desired temperature. The heated air first comes in contact with the test strip 20 about the middle thereof and flows in opposite directions along the strip and out through the end holes 22 and 28 of the casing. The temperature of the heating gases and therefore of the strip is measured by the thermometers 48 and 50 located in the upper and lower portions of the casing 10 respectively.

In order to maintain a more nearly uniform temperature within the casing 10 a portion of the heating air entering the casing is recirculated. Interconnecting the upper portion of casing 10 and the upper arm 45 of the heating chamber 36 there is a conduit 52 and a similar conduit 54 interconnects the lower portion of casing 10 with the arm 46. The pipes 42 and 44 preferably extend well into the arms 45 and 46 respectively and the ends of the pipes are formed into the jets 56 and 58. The flow of air through jet 56 causes air to be drawn from the top of casing 10 through conduit 52 in a well known manner to produce a circulation of gas through the heating chamber 36, casing 10, conduit 52 and arm 45. In a similar manner the flow of air through jet 58 produces circulation of air through heating chamber 36, casing 10, conduit 54 and arm 46. The flow of air through the pipes 42 and 44 is regulated by adjustment of valves 60 and 62.

From the above description it is apparent that the present invention comprises a compact and efficient structure for testing the tensile properties of a material at a controlled temperature. The apparatus has been found particularly useful in testing the tensile properties of relatively fragile materials, for example finely porous, permeable membranes to be used in separating gases by diffusion at temperatures above atmospheric temperature. The jets 56 and 58 produce effective circulation of the heating gas thus ensuring uniformity of temperature and the temperature may be easily and accurately controlled either by adjusting the heating energy supply to the heating element 38 or by adjustment of the control valves 60 and 62.

It is of course to be understood that the invention is not limited to the specific details described above. Thus if it is desired that the tensile properties of a test piece be measured at a temperature below that of the atmosphere a suitable refrigerator may be substituted for the heating chamber 36. Other variations within the scope of the invention will occur to those skilled in the art.

We claim:

1. In apparatus for measuring the tensile properties of a material, in combination, a test chamber, means for supporting a test piece of said material within said test chamber, tensioning means for applying tension to said test piece, gas supply means for continuously supplying a heated gas to said chamber at a point near the center of said test piece to cause a stream of said gas to flow over said test piece in opposite directions toward the ends of said piece, and means for withdrawing gas from said chamber at points spaced axially of the chamber at opposite sides of the point where said gas is admitted to said chamber.

2. In apparatus for measuring the tensile properties of a material, in combination, a test chamber, means for supporting a test piece of said material within said test chamber, tensioning means for applying tension to said test piece, a fluid supply conduit for supplying a heated fluid to said test chamber to cause said fluid to flow over said test piece and maintain said test piece at a predetermined desired temperature, said supply conduit including a fluid jet, a fluid return conduit connected to said supply conduit at a point near said jet and to said test chamber at a point spaced from said supply conduit to cause said jet to produce a circulatory flow of said heated fluid within said test chamber, said test chamber being provided with an opening through which a portion of the fluid can escape from the apparatus.

3. In apparatus for measuring the tensile properties of a material, in combination, a test chamber, means for supporting a test piece of said material within said test chamber, tensioning means for applying tension to said test piece, a pair of fluid supply conduits for conducting a heated fluid to a point near the center of said test chamber to cause said heated fluid to flow over said test piece in opposite directions toward the ends of said test piece, each of said fluid conduits being provided with a fluid jet, a pair of fluid return conduits connected at one end of each of said return conduits to said test chamber at points spaced oppositely from the point to which said fluid is admitted to said chamber, the opposite end of each of said return conduits being connected respectively one to each of said supply conduits adjacent said jets to cause said jets to produce circulatory flow of said heated fluid within said test chamber, and said test chamber being provided with an opening through which a portion of said fluid can escape from the apparatus.

4. Apparatus for measuring the tensile properties of a material comprising a test chamber, means for supporting a test piece of said material within said test chamber, means for applying tension to said test piece, a source of gas under pressure, a gas conduit connected to said source and terminating in a jet, gas temperature adjusting means disposed to receive gas from said jet and to adjust the temperature of the gas, a conduit connecting said temperature adjusting means and said test chamber to conduct gas at the adjusted temperature into said chamber to flow over said test piece, and a gas return conduit connected to said test chamber and to said temperature adjusting means, the point of connection of the said return conduit and said temperature adjusting means being adjacent said jet whereby the operation of the jet produces a region of low pressure causing the flow of gas through said return conduit from said test chamber to said temperature adjusting means, said test chamber being provided with an opening through which a portion of said gas can escape.

CLIFFORD K. BECK.
DAVID KIRKPATRICK.

REFERENCES CITED

The following references are of record in the file of this patent:

UNITED STATES PATENTS

| Number | Name | Date |
| --- | --- | --- |
| 2,033,588 | Piggott et al. | Mar. 10, 1936 |
| 2,245,269 | Gilbert | June 10, 1941 |
| 2,299,867 | Wolfson | Oct. 27, 1942 |
| 2,351,572 | Kingston | June 13, 1944 |
| 2,375,034 | Semchyshen | May 1, 1945 |